UNITED STATES PATENT OFFICE.

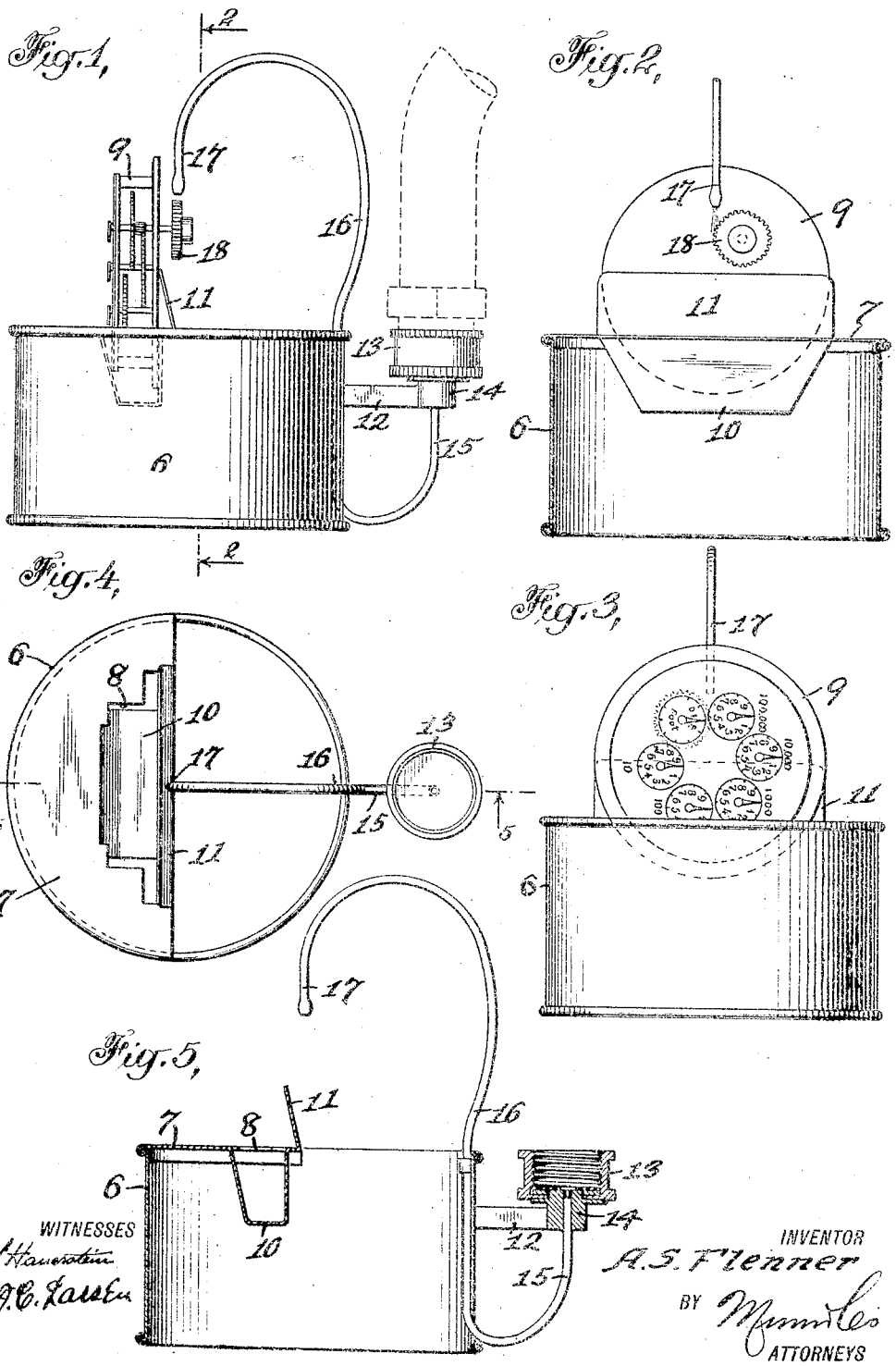

ARTHUR S. FLENNER, OF BILLINGS, MONTANA.

WATER-METER ADJUSTER.

1,198,208.  Specification of Letters Patent.  Patented Sept. 12, 1916.

Application filed May 23, 1916. Serial No. 99,291.

*To all whom it may concern:*

Be it known that I, ARTHUR S. FLENNER, a citizen of the United States, and a resident of Billings, in the county of Yellowstone and State of Montana, have invented certain new and useful Improvements in Water-Meter Adjusters, of which the following is a specification.

My invention relates to the re-setting of water meters back to zero when this is desired for any reason, particularly when the meter is undergoing repair, and the main object of the invention is to provide means for accomplishing this result to supplant the present time consuming manual method.

A further object is to accomplish this result by means of water under pressure and without any structural alteration in the meter or, rather, in the dial thereof, the invention comprising a holder for the meter dial and means for directing a stream of water against the periphery of the operating gear of the dial.

My invention is fully described in the following specification, of which the accompanying drawings form a part, in which like characters refer to like parts in each of the views, and in which:—

Figure 1 is a side elevation of my invention with a meter dial held therein in position to be re-set; Fig. 2 is a section taken on the line 2—2 of Fig. 1; Fig. 3 is an elevation taken from the left of Fig. 1; Fig. 4 is a top plan view of the invention alone; and Fig. 5 is a section taken on the line 5—5 of Fig. 4.

Referring to the drawings, 6 represents a cylindrical body member open at the bottom and partially closed at its top by means of a plate 7, the latter having an opening 8 cut therein of a shape conforming to the dial member 9 of a water meter, said plate having a pocket 10 suspended therefrom to receive the dial member and having an inclined plate 11 at its inner edge to divert water from the dial member.

The body member 6 has a bracket 12 at one side thereof carrying a rotatable internally threaded collar 13 serving as a connection with a hose bib, faucet, or the like, said collar being rotatable on a tubular member 14 having a pipe of small diameter led downwardly therefrom as shown at 15, thence upwardly as shown at 16 and thence downwardly as shown at 17 to a point above the inclined plate 11 directly over one side of the actuating gear 18 of the dial member 9. This gear is connected, by suitable trains of gears, with the index fingers on the face of the dial and which fingers it is desired to re-set to initial or zero position and, when the water under pressure strikes the edge of the gear 18 the connected gears are actuated to bring all of the index fingers back to zero, this requiring no attention whatever and overcoming the present loss of time required for manual re-setting.

While I have shown one embodiment of the invention I do not desire to limit myself to the specific details, as many structural forms may and will suggest themselves, my invention consisting broadly of means for directing a stream of water under pressure to the actuating gear of the dial member of a meter.

Having fully described my invention, what I claim as new, and desire to secure by Letters Patent, is:—

As an article of manufacture, adapted to receive the detached dial member with its operating gear of a meter, a body member having a pocket formed therein for said member, a pipe having its outlet adjacent and above said pocket, and means for connecting said pipe with a source of water supply.

ARTHUR S. FLENNER.